(12) United States Patent
Yamamoto et al.

(10) Patent No.: US 7,216,746 B2
(45) Date of Patent: May 15, 2007

(54) BRAKE DRUM AND PROCESS FOR MANUFACTURING THE SAME

(75) Inventors: Naoaki Yamamoto, Ueda (JP); Tsuyoshi Haruhara, Ueda (JP); Satoshi Matsuura, Sayama (JP); Hiroto Shoji, Sayama (JP); Takaharu Echigo, Sayama (JP); Masashi Hara, Sayama (JP); Hiroki Takano, Sayama (JP); Yusuke Toyoda, Wako (JP); Takahiro Mizukami, Wako (JP); Katsuhiro Shibata, Wako (JP)

(73) Assignees: Nissin Kogyo Co., Ltd., Nagano (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/040,708

(22) Filed: Jan. 21, 2005

(65) Prior Publication Data

US 2005/0167214 A1 Aug. 4, 2005

(30) Foreign Application Priority Data

Feb. 3, 2004 (JP) ............................. 2004-027155

(51) Int. Cl.
*F16D 65/00* (2006.01)
*B23Q 7/00* (2006.01)

(52) U.S. Cl. .................... 188/218 R; 188/251 A; 188/251 R; 29/559; 192/107 M (58) Field of Classification Search ............ 188/264 R, 188/218 R, 251 R, 251 M, 251 A; 192/107 M; 428/328, 329, 559, 539.5, 325, 331; 164/113, 164/98; 29/559; 501/127
See application file for complete search history.

(56) References Cited

U.S. PATENT DOCUMENTS

| | | | | | |
|---|---|---|---|---|---|
| 4,154,900 A | * | 5/1979 | Kaku et al. | ................... | 428/554 |
| 5,782,324 A | * | 7/1998 | Wall | ........................ | 188/218 R |
| 5,980,792 A | * | 11/1999 | Chamlee | ..................... | 264/40.1 |
| 6,180,258 B1 | * | 1/2001 | Klier | ......................... | 428/539.5 |
| 6,290,031 B1 | * | 9/2001 | Nakamura et al. | ....... | 188/218 R |
| 6,530,458 B1 | * | 3/2003 | Rau, III | ................... | 188/218 R |
| 6,601,284 B1 | * | 8/2003 | Wall | .............................. | 72/83 |
| 2003/0175543 A1 | * | 9/2003 | Lo | ............................. | 428/614 |

FOREIGN PATENT DOCUMENTS

| | | | |
|---|---|---|---|
| JP | 2001-316740 | | 11/2001 |
| JP | 2002-066724 | | 3/2002 |
| JP | 2003252693 A | * | 9/2003 |

* cited by examiner

*Primary Examiner*—Melody M. Burch
(74) *Attorney, Agent, or Firm*—Hamre, Schumann, Mueller & Larson, P.C.

(57) ABSTRACT

A brake drum has its strength elevated in its disk portion. The brake drum is formed from a composition having ceramics dispersed in a matrix. The disk portion has a high ceramic content and thereby a high strength. The brake drum has a disk portion and a cylindrical portion. The disk portion has a first ceramic content by volume and the cylindrical portion has a second ceramic content by volume that is less than the first ceramic content by volume as a result of the application of a higher compression ratio to the disk portion.

3 Claims, 10 Drawing Sheets

BRAKE DRUM AND PROCESS FOR MANUFACTURING THE SAME

FIELD OF THE INVENTION

This invention relates to a brake drum made of a composite material for use in a vehicular brake system and a process for manufacturing such a brake drum.

BACKGROUND OF THE INVENTION

It has often been the case in recent years to use an aluminum alloy or an aluminum alloy composite material (MMC) for vehicles to reduce their weight. It is needless to say that a reduction in the weight of the brake system is also important and in an internally expanding type drum brake, for example, there has been sought an art using an aluminum alloy composite material (MMC) for the brake drum rotating with a wheel.

As regards the art using an aluminum alloy composite material (MMC), there is known an art adopting it for pulleys as disclosed in, for example, JP-A-2001-316740.

An art adopting an aluminum alloy composite material (MMC) for heat dissipating members is known from, for example, JP-A-2002-66724.

The process for manufacturing a pulley as disclosed in JP-A-2002-316740 will be described with reference to FIG. 10 hereof.

Figure 10:
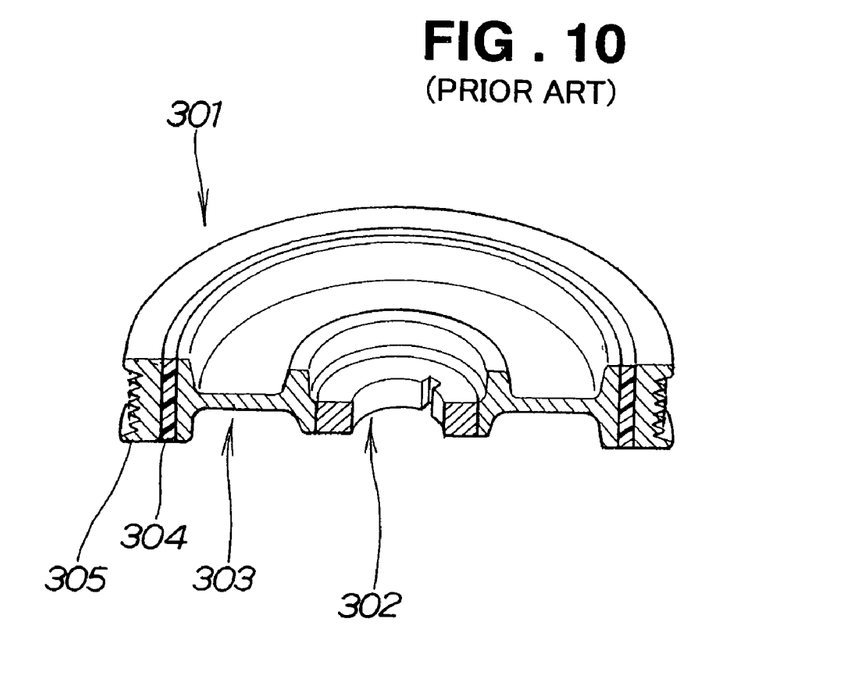
FIG. 10 is a view showing a pulley known in the art and formed partly from a composite material.

The pulley 301 shown in FIG. 10 has a hub 302 of a composite material in its center, an aluminum alloy disk 303 formed integrally with the hub 302 and a grooved portion 305 fitted about the disk 303 with a shock absorbing member 304 inserted therebetween, and a force for tightening bolts for securing the pulley 301 to a shaft is borne by the hub 302 of high strength.

Referring to the process for manufacturing the pulley 301, the hub 302 is first formed by extrusion molding a cylinder from a composite material and cutting it. Then, the hub 302 is set in a pulley casting mold and a molten aluminum alloy is poured into the mold.

The pulley manufacturing process described above requires the separate steps of making two parts, the hub 302 of a composite material and the disk 303 of an aluminum alloy, and its production calls for a great deal of time and labor. The working conditions in the manufacturing process of both the hub 302 and the aluminum alloy disk 303 are complicated and troublesome.

The process for manufacturing a composite material disclosed in JP-A-2002-66724 will now be described with reference to FIGS. 11A, 11B and 11C.

Figure 11A:
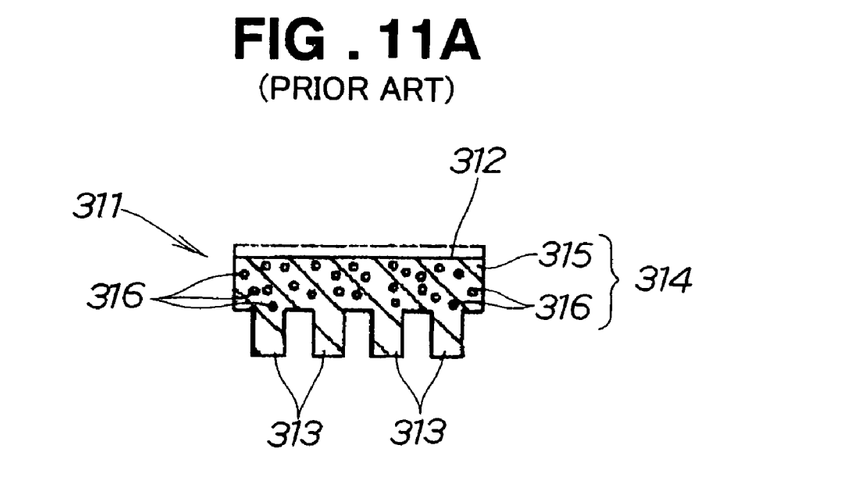
FIGS. 11A to 11C are views showing a process known in the art for manufacturing a composite material.

A product 311 of a composite material as shown in FIG. 11A includes a base portion 312 and a plurality of fins 313 formed on a surface of the base portion 312.

Figure 11B:
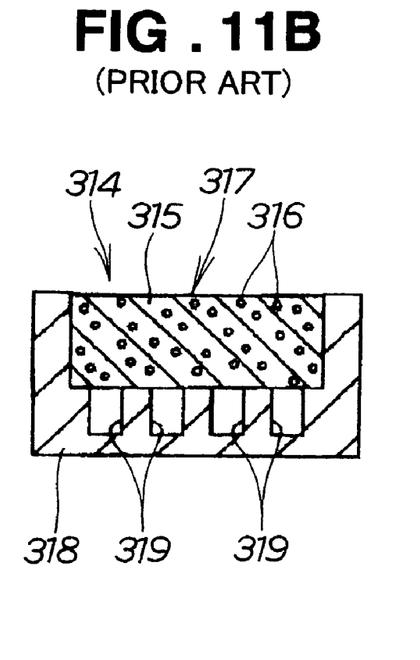

Firstly, a metal matrix composite material 314 is produced from an aluminum alloy 315 and fine particles 316 of silicon carbide and formed into a block 317, as shown in FIG. 11B. Secondly, the block 317 which has been heated is placed in a mold 318 (having fin spaces 319) and compressed.

Figure 11C:
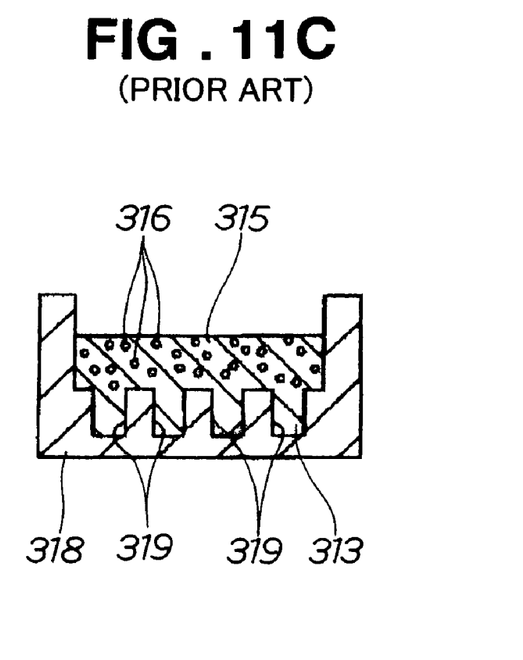

When it is compressed, the aluminum alloy 315 flows into the fin spaces 319 and forms aluminum alloy fins 313, as shown in FIG. 11C.

According to this process for manufacturing a composite material, however, it is impossible to incorporate fine particles of silicon carbide adequately into the fins 313, though it may be possible to save the time and labor for its manufacture, and the fins 313 are exclusively of an aluminum alloy and too low in strength. It is impossible to distribute a desired proportion by volume of silicon carbide in the center of each fin 313 and as a result, it is difficult to utilize the strength of a composite material effectively.

Thus, there is sought an art which makes it possible to increase the strength of the disk portion of a brake drum of a metal matrix composite material (MMC) and manufacture a brake drum having a disk portion of improved strength without calling for a great deal of time and labor.

SUMMARY OF THE INVENTION

According to an aspect of the present invention, there is provided a cup-shaped brake drum comprising: a disk portion to which an axle is secured; and a cylindrical portion protruding from the outer edge of the disk portion in parallel to the axle, the brake drum being formed from a composition containing ceramics dispersed in a metal matrix, the disk portion having a first ceramic content by volume and the cylindrical portion having a second ceramic content by volume that is less than the first ceramic content by volume as a result of the application of a higher compression ratio to the disk portion. Thus, the brake drum advantageously has its strength elevated in its disk portion which will be subjected to an axial force when the bolts are tightened, though it does not rely upon any combination of a composite material and an ordinary metal not forming any composite material.

The disk portion preferably has along its outer edge a conical part to which the cylindrical portion is connected. The conical part enables the matrix metal to flow substantially uniformly in every radial direction from the shape of a preform when the preform set in a mold is horizontally stretched for press forming, so that it is possible to restrain the occurrence of any cold shut from the confluence of the preform, the occurrence of any scraped flaw or the deformation of any shape by shrinkage, etc. Accordingly, it is advantageously possible to achieve a high yield.

According to another aspect of the present invention, there is provided a process for manufacturing a cup-shaped brake drum having a disk portion to be secured to an axle and a cylindrical portion protruding from the outer edge of the disk portion in parallel to the axle and having an inner peripheral surface with which a brake shoe may be brought into contact to exhibit a braking action, the process comprising the step of preparing a perform by dispersing ceramics in a metal matrix and the step of compression-molding the perform by applying a higher compression ratio to the disk portion than to the rest, so that the matrix is moved from the disk portion to its outer edge and the disk portion having a first ceramic content by volume and the cylindrical portion having a second ceramic content by volume that is less than the first ceramic content by volume as a result of the application of a higher compression ratio to the disk portion.

Thus, the mere closure of a mold makes it possible to obtain a disk portion of increased strength and thereby manufacture a brake drum having a disk portion of increased strength without calling for any substantial amount of time or labor.

The preform preferably has a large thickness along its outer edge and a small thickness in the rest thereof, so that the outer edge may have a higher compression ratio than the rest.

The preform having a large thickness in its portion for forming the outer edge of the disk portion of a brake drum and a small thickness in its portion for forming the rest of the brake drum as stated gives a higher compression ratio along its outer edge as compression molded than in the rest. Thus, the preform having a large thickness along its outer edge and a small thickness in the rest thereof and achieving a higher compression ratio along the outer edge than in the rest eventually makes it possible to manufacture a brake drum having an increased strength along its outer edge without having its outer edge altered in structure and without calling for any substantial time or labor.

The mold used for the compression molding step has its cavity clearances so selected that the disk portion may have a higher compression ratio than the rest. Thus, the cavity clearances of the mold can be relied upon for selecting the ceramics content by volume of the disk portion and manufacturing a brake drum having a disk portion of increased strength without calling for any substantial time or labor.

BRIEF DESCRIPTION OF THE DRAWINGS

Several preferred embodiments of this invention will now be described in detail with reference to the accompanying drawings, in which.

DETAILED DESCRIPTION OF THE PREFERRED EMBODIMENTS

Figure 1:
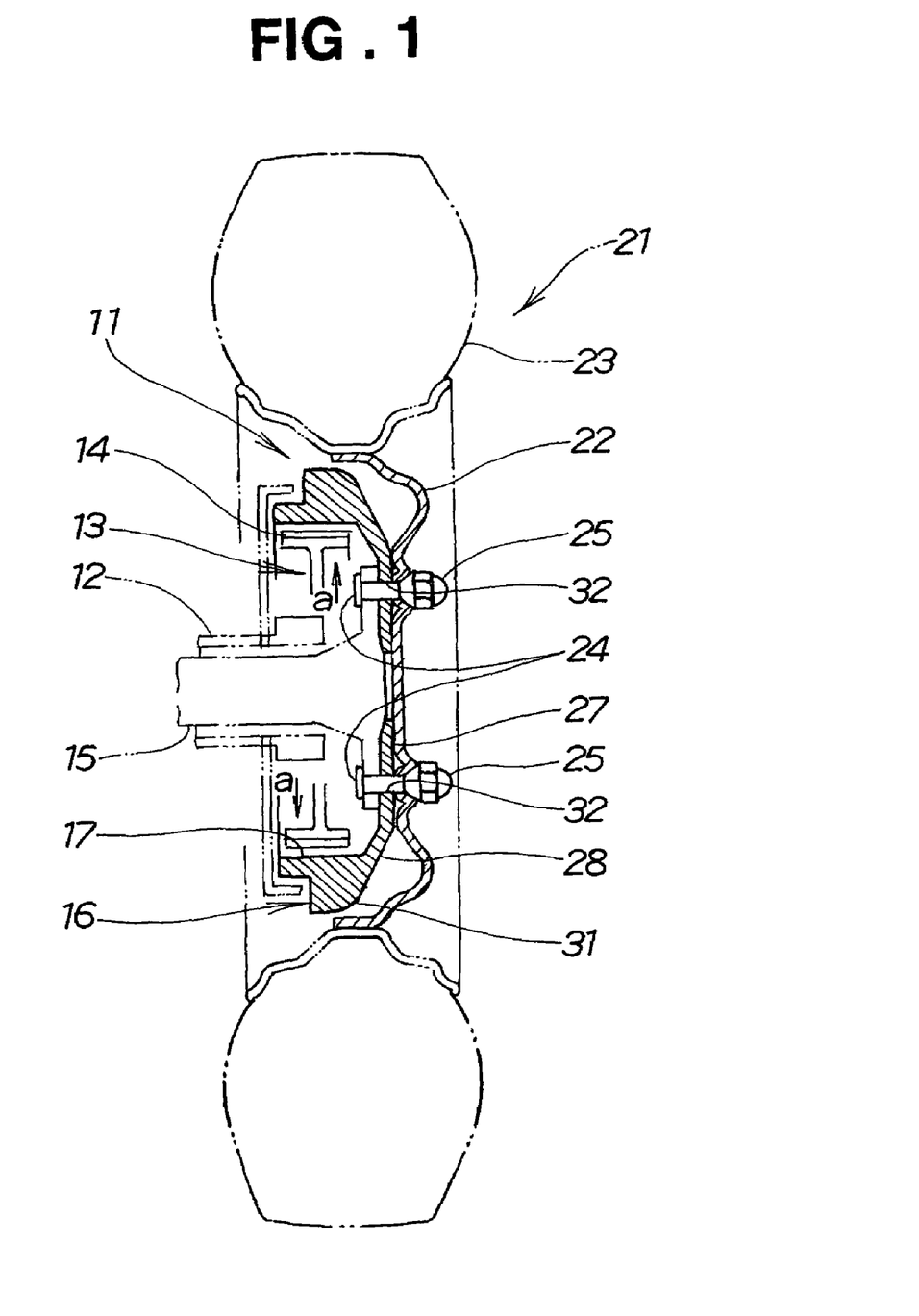
FIG. 1 is a sectional view of a drum brake including a brake drum according to this invention.

Referring now to FIG. 1, the drum brake 11 has a brake shoe 13 attached expansibly to an axle tube 12 by a plate not shown and having a lining 14 and a brake drum 16 fixed integrally to a drive or driven axle 15 by a fixing pin not shown and rotatable with the axle 15 and the brake shoe 13 can be pressed in the directions of arrows a against the inner surface 17 of the brake drum 16 to apply friction thereto to stop the rotation of a wheel 21.

The wheel 21 has a wheel 22 and a tire 23 attached to the wheel 22. The wheel 21 is connected to the axle 15 by a plurality of bolts 24 and a plurality of wheel nuts 25.

The brake drum 16 has the shape of a cup defined by a disk portion 27 fixed to the axle 15 and a cylindrical portion 31 protruding from the outer edge 28 of the disk portion 27 in parallel to the axle 15. Its inner surface 17 receives the pressing force of the brake shoe 13. Reference numeral 32 denotes holes made through the disk portion 27 for the bolts 24 to pass therethrough.

Figure 2A:
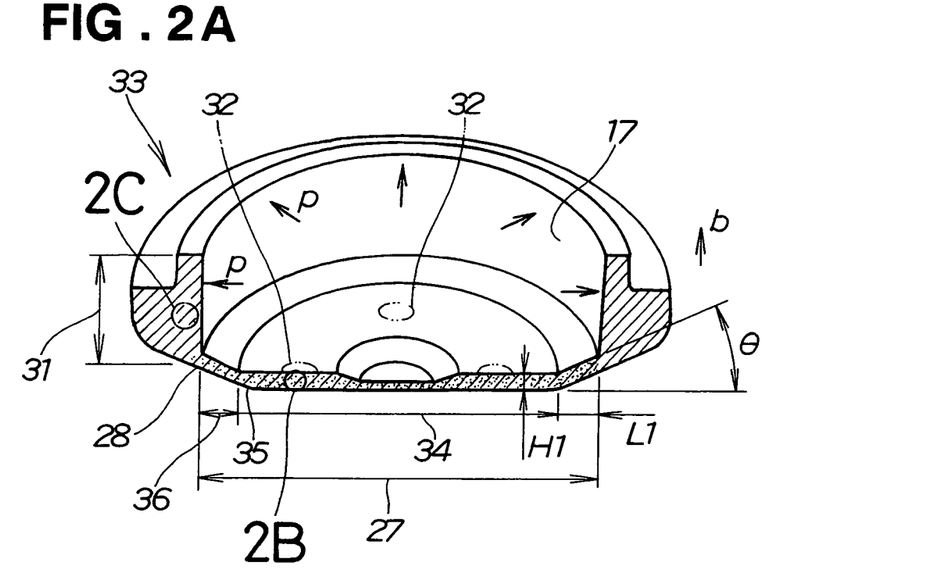
FIGS. 2A to 2C are a sectional view of the brake drum shown in FIG. 1 and fragmentary enlarged views thereof, respectively.
Figure 2B:
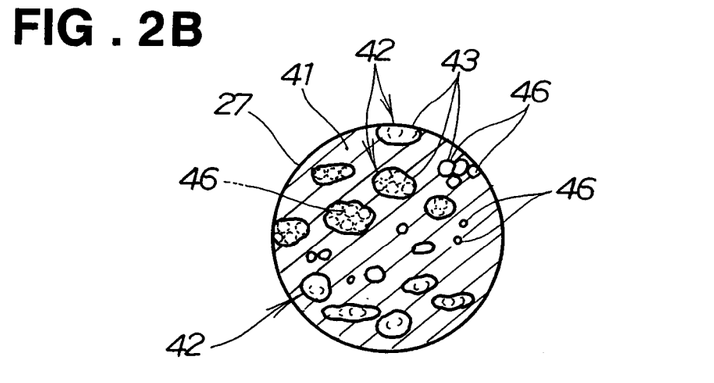
Figure 2C:
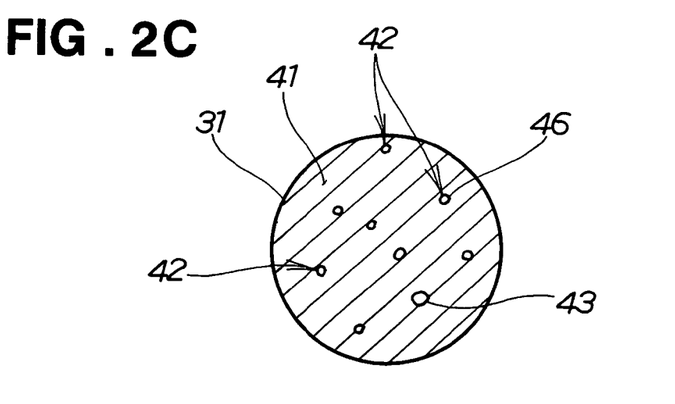

FIGS. 2A to 2C show a molded drum 33 from which the brake drum 16 of this invention can be obtained.

The molded drum 33 shown in FIG. 2A is substantially of the same shape as the brake drum 16 shown in FIG. 1.

The molded drum 33 has a disk portion 27 and a cylindrical portion 31 protruding from the outer edge 28 of the disk portion 27 like the brake drum 16 (see FIG. 1). The disk portion 27 has a connecting part 34 and a conical part 36 formed along the outer circumference 35 of the connecting part 34 forming the outer circumference 35 of the disk portion 27. The cylindrical portion 31 is contiguous to the conical part 36.

The cylindrical portion 31 has an inner surface 17 which is a portion formed by the molded drum 33 being worked by a machine tool, for example, cut and grind-finished. H1 indicates the height of a preform as molded, or the thickness of the disk portion 27 (connecting part 34) excluding the conical part 36.

The conical part 36 is contiguous to the outer circumference 35, is inclined upwardly (as shown by an arrow b) by a specific angle θ and extends radially outwardly by a specific distance L1. It is a portion upon which a large force bears when a surface pressure p is applied to the cylindrical portion 31 by the brake shoe 13 (see FIG. 1) for braking purposes.

FIG. 2B is a symbolically enlarged illustration of part b in FIG. 2A.

The disk portion 27 is a portion so molded as to contain about 38% of ceramics 42 in a metal 41. An aluminum alloy was used as the metal 41. The ceramics 42 are, for example, aggregates 43 of alumina.

The ceramic content by volume Vf (%) is expressed as (Ceramics volume/(Matrix volume+Ceramics volume))×100.

The ceramic content by volume Vf of the disk portion 27 is expressed as Vm (about 38%). Its Young's modulus is expressed as Em.

The ceramic content by volume Vf of the conical part 36 (see FIG. 2A) is expressed as Vc (about 38%). Its Young's modulus is expressed as Ec, which is equal to Em.

FIG. 2C is a symbolically enlarged illustration of part c in FIG. 2A.

The cylindrical portion 31 is a portion so molded as to contain about 20% of ceramics 42 in the metal 41.

The ceramic content by volume Vf of the cylindrical portion 31 is expressed as Ve (about 20%). Its Young's modulus is expressed as Ee, which is lower than Em.

Thus, the ceramic content by volume Vf of the brake drum 16 (see FIG. 1) gradually decreases from its disk portion 27 to its cylindrical portion 31. Accordingly, the brake drum 16 (FIG. 1) has a Young's modulus decreasing gradually from its disk portion 27 to its cylindrical portion 31.

Without relying upon any combination of a composite material and a metal, the brake drum 16 shown in FIG. 1 has its strength elevated in its disk portion 27 which will be subjected to an axial force when the bolts 24 are tightened, since its disk portion 27 has a high ceramic content equal to about 38% by volume, while the outer edge 28 of its disk portion 27 and its cylindrical portion 31 have a ceramic content decreasing gradually to about 20% by volume, as stated above.

The conical part 36 enables the matrix metal to flow substantially uniformly in every radial direction from the shape of a preform when the preform set in a mold is horizontally stretched for press forming, so that it is possible to restrain the occurrence of any cold shut from the confluence of the preform, the occurrence of any scraped flaw or the deformation of any shape by shrinkage, etc., since the conical part 36 is formed along the outer circumference 35 of the disk portion 27 and the cylindrical portion 31 is connected to the conical part 36, as shown in FIG. 2A.

Accordingly, it is possible to achieve a high yield.

As the conical part 36 enables the matrix metal to flow substantially uniformly in every radial direction from the shape of the preform, it is possible to lower the mold temperature and the preform heating temperature and thereby improve productivity.

Description will now be made of a process for manufacturing the brake drum 16 (FIG. 1) of a metal matrix composite material.

While the process for manufacturing a brake drum has the steps of preparing a preform and compression molding it, the steps of producing a composite material, preparing a preform, heating the preform and compression molding it will now be described separately from one another.

FIGS. 3A to 3D and 4A and 4B show the step of preparing a preform for the manufacturing process of this invention, i.e. the steps of producing a composite material and preparing a preform therefrom.

Figure 3A:
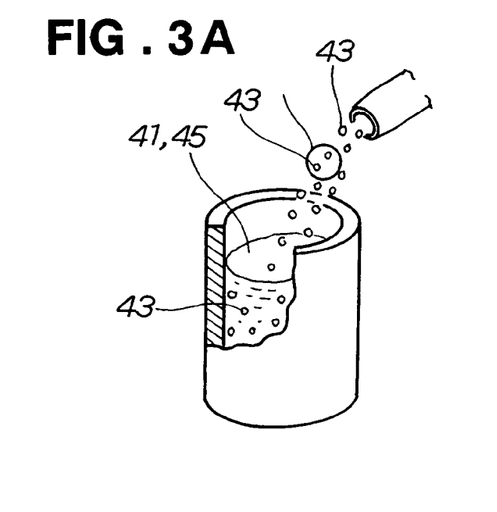
FIGS. 3A to 3D are views showing a method of preparing a metal matrix composite material for forming a preform.

Referring first to the step of producing a composite material, a matrix and ceramics are mixed to produce a metal matrix composite material. More specifically, an aluminum alloy 45 conforming to JIS A6061 is used as the matrix (metal 41). Alumina aggregates 43 are used as the ceramics.

Figure 3B:
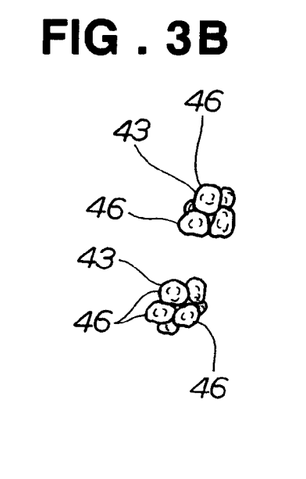

FIG. 3B is an enlarged view of part b in FIG. 3A, showing aggregates 43 symbolically. Each aggregate 43 is a lump of particles 46 of alumina ($Al_2O_3$). Each aggregate 43 has a diameter of about 50 μm. The particles 46 of alumina ($Al_2O_3$) have a diameter of about 1 μm.

It is also possible to use ceramics other than particles of alumina ($Al_2O_3$). Reinforcing materials which can be used instead of ceramics include carbon fibers (filaments or staple fibers).

Referring first to FIG. 3A, an aluminum alloy 45 having a specific weight is melted, aggregates 43 having a specific weight are placed in the molten aluminum alloy 45 and the alloy is stirred. The stirred aluminum alloy 45 is placed in an appropriately shaped and sized ingot mold 47 (see FIG. 3C) and allowed to solidify, whereby a block of a metal matrix composite material 48 (see FIG. 3C) is obtained.

Figure 3C:
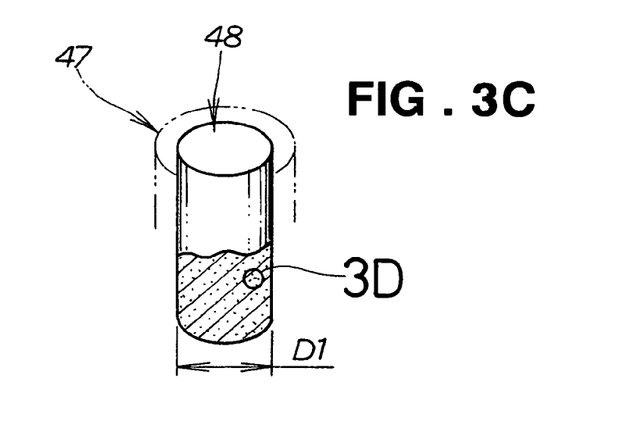

Referring to FIG. 3C, the block of the metal matrix composite material 48 is worked into a specific size for preparing a preform. D1 indicates its diameter.

Figure 3D:
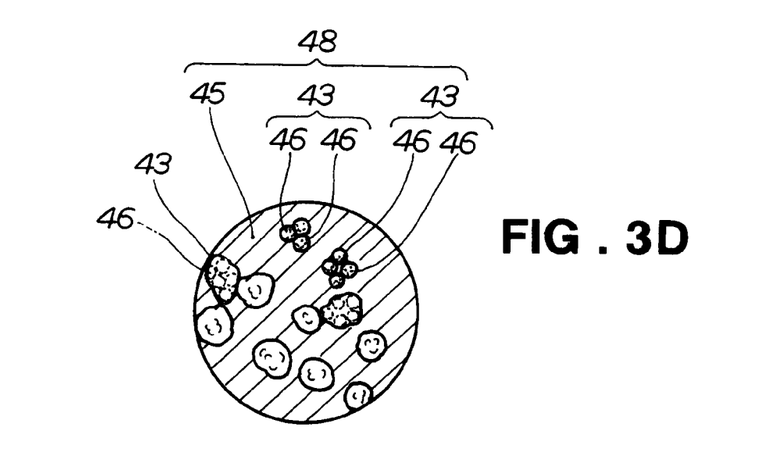

FIG. 3D is an enlarged view of part d in FIG. 3C, showing the metal matrix composite material 48 symbolically. The metal matrix composite material 48 is composed of the aluminum alloy 45 and the aggregates 43 of alumina particles 46.

The ceramic content by volume Vf of the metal matrix composite material 48 is expressed as Vb (about 23 to 24%). Its Young's modulus is expressed as Eb (Eb<Em).

Figure 4A:
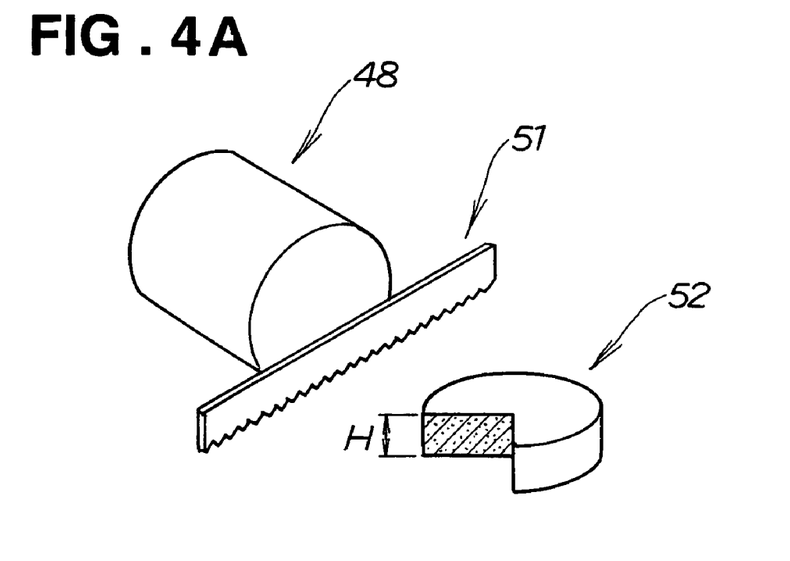
FIG. 4A is a view showing a preform formed from the metal matrix composite material shown in FIG. 3C.

In the step of preparing a preform as shown in FIG. 4A, the metal matrix composite material 48 is cut by a cutter 51 to form a preform 52 having a height (or width) H. H is also the height of the preform 52 yet to be worked upon. The preform is a blank which has not been preliminarily worked upon.

Figure 4B:
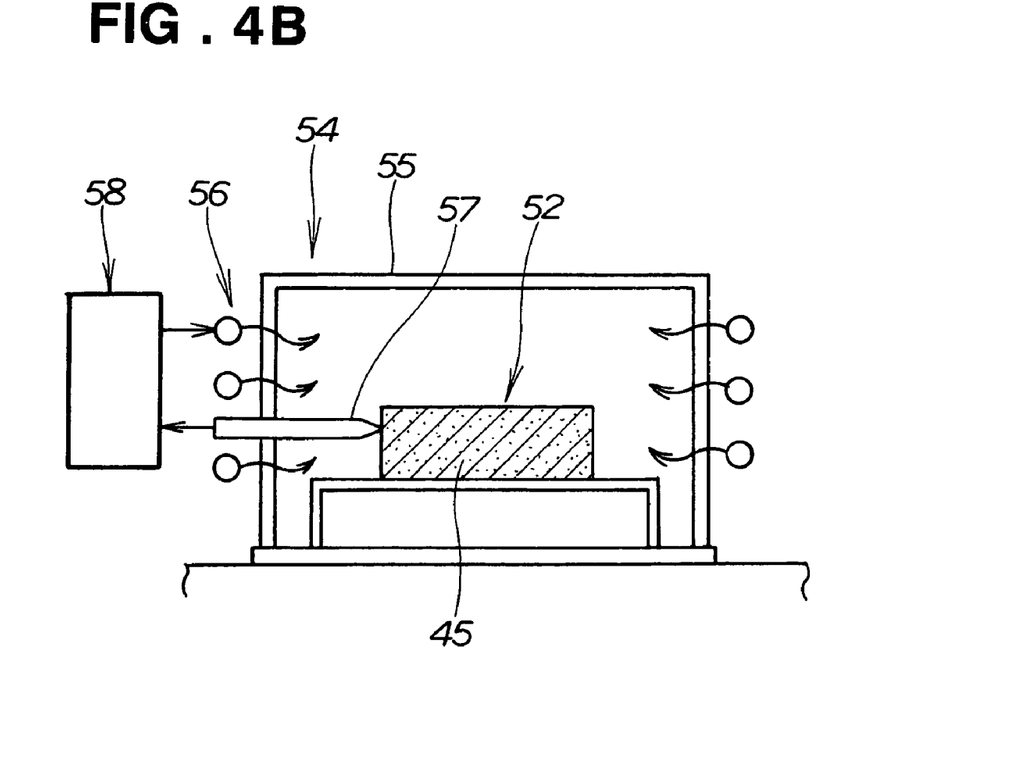
FIG. 4B is a view showing the heating of the preform as formed.

The preform 52 prepared from the metal matrix composite material 48 is conveyed to the station where it is heated. In the step of heating the preform as shown in FIG. 4B, the preform 52 is heated by a heating furnace 54 under specific temperature conditions. The heating furnace 54 has a furnace body 55, a heater 56, a thermocouple 57 and a control unit 58 for controlling the heater 56 in accordance with information from the thermocouple 57 and pre-selected conditions.

Figure 5:
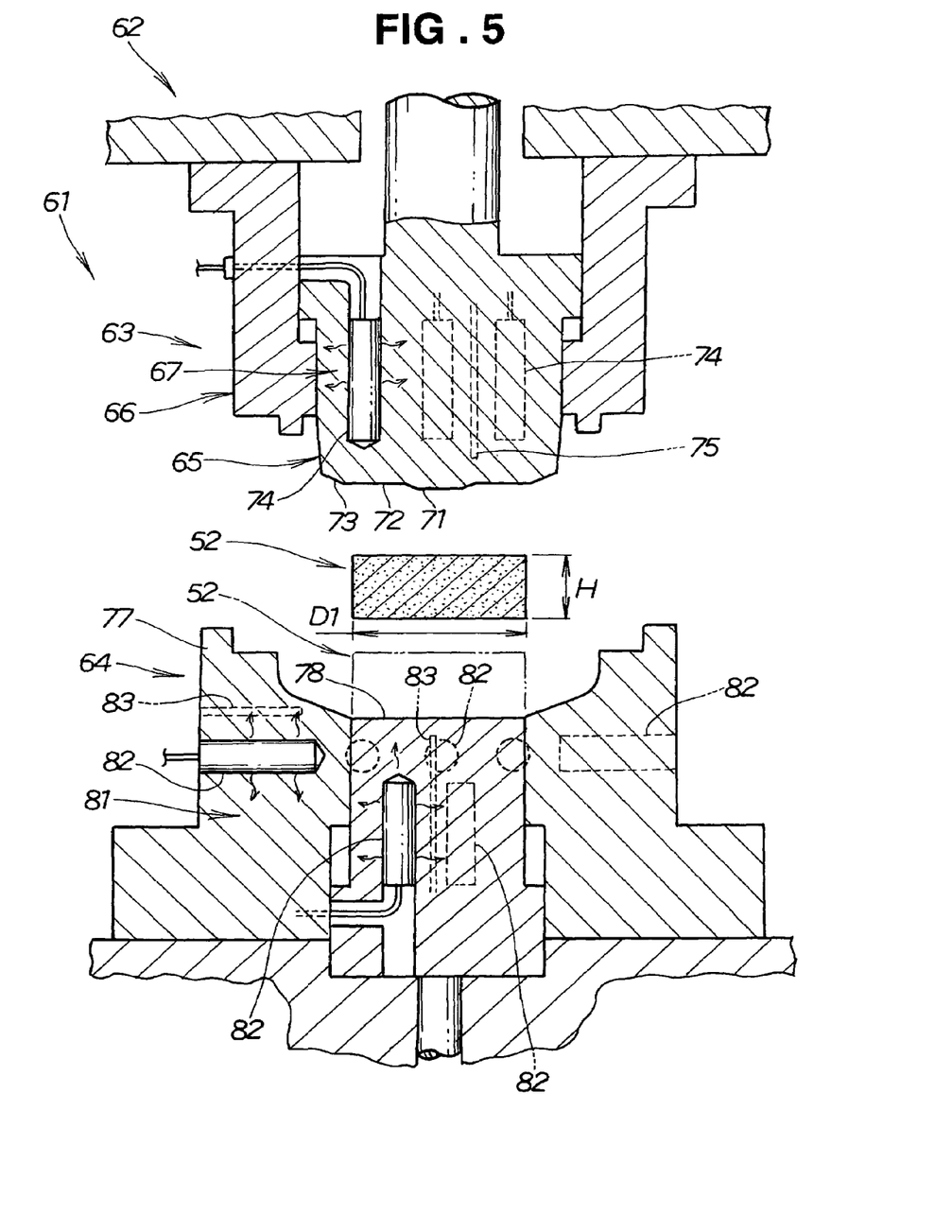
FIGS. 5 to 8 are views showing the compression molding step of a manufacturing process according to this invention.

The specific temperature employed as the temperature conditions for the preform heating step is a temperature which is in the vicinity of the melting temperature of the aluminum alloy 45 and can be set for a split mold 61 (see FIG. 5). The aluminum alloy conforming to JIS A6061 is, for example, held at a temperature of 580° C. to 750° C. The preform 52 is taken out at a temperature of, for example, 700° C. and conveyed to the station where it is compression molded.

Description will now be made of the step of compression molding the preform with reference to FIGS. 5 to 8. Referring to FIG. 5, the preform 52 having a temperature of 700° C. is set in the split mold 61 as shown by a two-dot chain line and the press 62 in which the split mold 61 is installed is operated to mold the preform 52 into a specific shape. The split mold 61 has a split upper punch 63 and a lower die 64. The split upper punch 63 has a centrally situated inner punch 65, an outer punch 66 situated outside the inner punch 65 and a punch temperature control device 67. In the example shown, the inner punch 65 is not lowered or raised itself, but is fixed to the outer punch 66 and lowered with it to the lower limit of the split upper punch 63.

The inner punch 65 has a convex centering mold surface 71, a flat mold surface 72 surrounding the centering mold surface 71 and a curved corner mold surface 73 surrounding the flat mold surface 72. The punch temperature control device 67 has a plurality of punch heaters 74 and a punch temperature sensor 75 and heats and holds the split upper punch 63 at a specific temperature (for example, 300° C.).

The lower die 64 has a main body 77, an ejector 78 installed in the center of the main body 77 and a die temperature control device 81. The die temperature control device 81 has a plurality of die heaters 82 and a plurality of die temperature sensors 83 and heats and holds the lower die 64 at a specific temperature (for example, 300° C.).

The press 62 is operated to force the inner punch 65 into the preform 52 having a temperature of 700° C. and set in the split mold 61.

Figure 6:
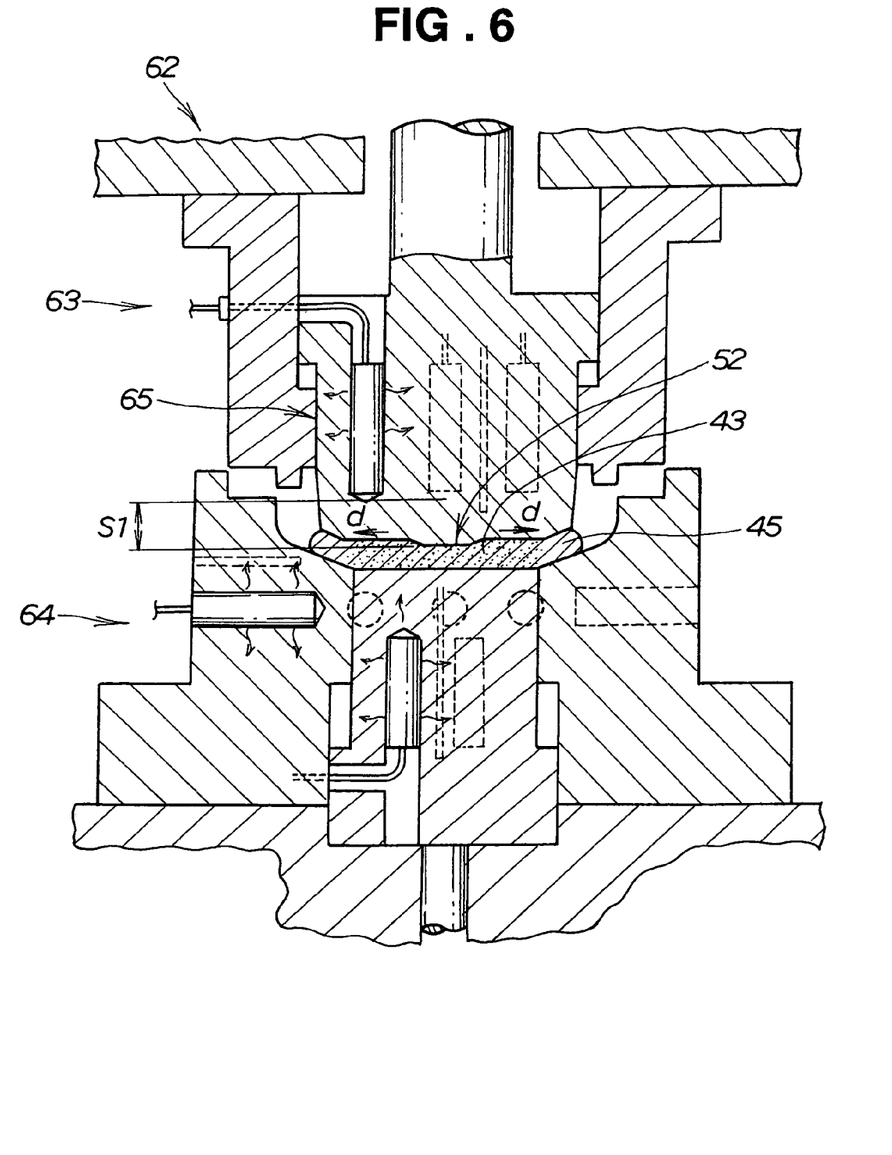

When the inner punch 65 is forced by a stroke S1 into the preform 52 as shown in FIG. 6, its matrix or aluminum alloy 45 having a good fluidity at 700° C. begins to be compressed and also flows radially outwardly of the preform from among the aggregates 43 as shown by arrows d. On the other hand, the aggregates 43 hardly move laterally, but move down and begin to break by contacting or striking upon one another into smaller aggregates or alumina ($Al_2O_3$) particles.

Figure 7:
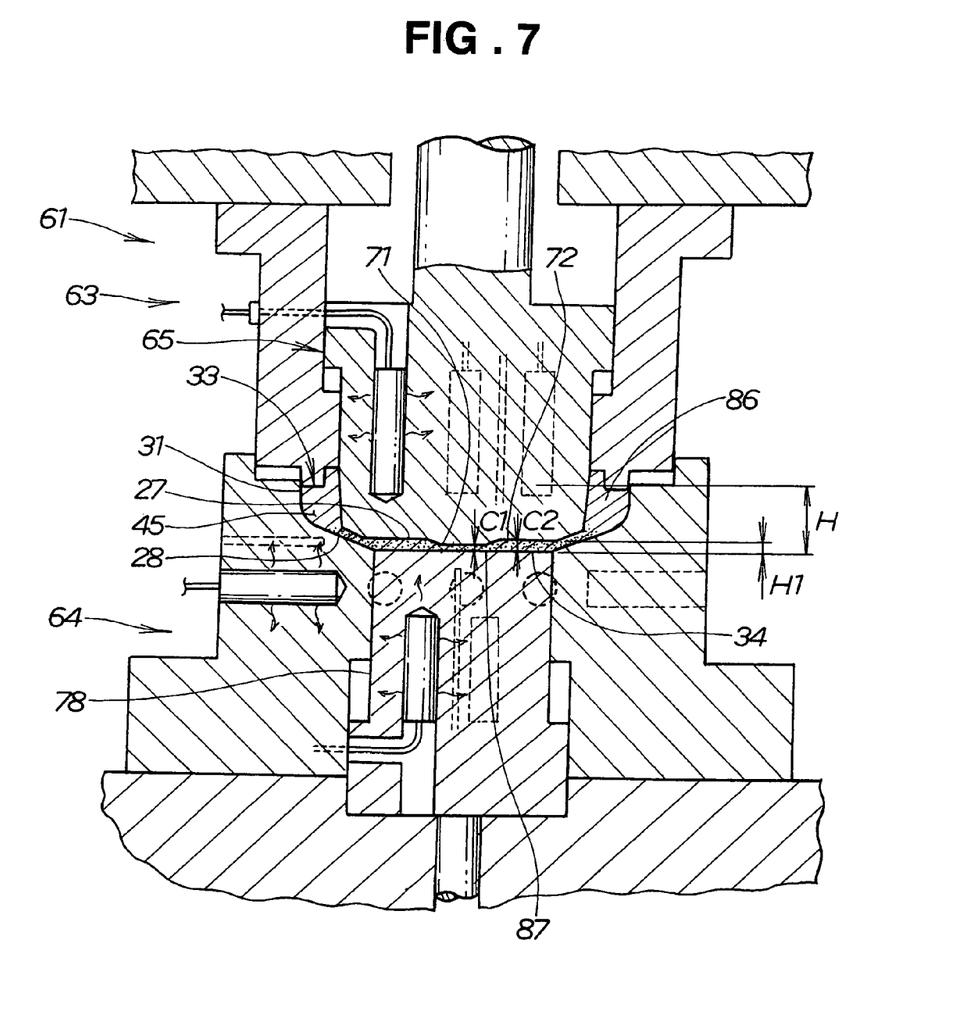

When the split upper punch 63 is further lowered until it reaches its lower limit, a molded drum 33 is obtained as shown in FIG. 7. The aluminum alloy 45 continues to flow radially outwardly until the split upper punch 63 reaches its lower limit, whereupon the molded drum 33 is obtained. On the other hand, the aggregates 43 turn into smaller aggregates or alumina ($Al_2O_3$) particles and almost all of them stay within the limit of the outside diameter D1 (FIG. 5) of the preform and in the disk portion 27 of the molded drum 33, while the rest thereof is forced radially outwardly by the aluminum alloy 45 flowing radially outwardly. As a result, the disk portion 27 of the molded drum 33 has a ceramic content by volume Vf raised to Vm (about 38%) and has a Young's modulus Em, while its cylindrical portion 31 has a ceramic content by volume Vf lowered to Ve (about 20%) and has a Young's modulus Ee.

The molded product has a compression ratio Rh expressed as Rh=H/H1, where H is the height of the preform still to be worked upon and H1 is the height of the preform as worked upon. The disk portion 27 has a compression ratio Rh (=H/H1) of, say, 6.5. No compression ratio Rh is set for any portion other than the disk portion 27. No compression ratio Rh is set for the cylindrical portion 31 when the shape of the preform 52 is used. Thus, the compression molding step is the step of compressing the disk portion 27 at a higher compression ratio than the cylindrical portion 31.

As the preform 52 is so compressed during the compression molding step that the molded product may have a higher compression ratio in its disk portion 27 than in any other portion thereof, and a higher ceramic content in its disk portion 27 than in its cylindrical portion 31 having a ceramic content decreasing gradually from the outer edge 28 of the disk portion 27, it is sufficient to close the split mold 61 to raise the strength of the disk portion 27 and manufacture a brake drum 16 having its disk portion 27 improved in strength without calling for any substantial amount of time or labor.

The split mold 61 has a cavity 86 in which the molded drum 33 is formed when the split mold 61 is closed. The split mold 61 has a cavity clearance C1 which is a distance between the centering mold surface 71 of the inner punch 65 and the ejector 78 in the lower die 64, and which may, for example, be set at 4 mm. It also has a cavity clearance C2 which is a distance between the flat mold surface 72 of the inner punch 65, and which may, for example, be set at 10 mm. As a result, the portion 87 molded in the cavity clearance C1 has a compression ratio Rh expressed as Rh=H/4, while the connecting portion 34 molded in the cavity clearance C2 has a compression ratio Rh expressed as Rh=H/10, so that the cavity clearance C1 achieves a higher compression ratio than the cavity clearance C2 and the portion 87 molded in the cavity clearance C1 has, therefore, a higher ceramic content by volume Vf than any other portion.

The cavity clearances C1 and C2 of the split mold 61 used in the compression molding step may be so selected as to vary the compression ratio of the disk portion 27 of the brake drum 16 (FIG. 1) and thereby its ceramic content by volume. When they are so selected that the disk portion 27 has a higher compression ratio than any other portion, it is possible to manufacture a brake drum 16 having its strength increased in its disk portion 27 without calling for any substantial amount of time or labor.

Figure 8:
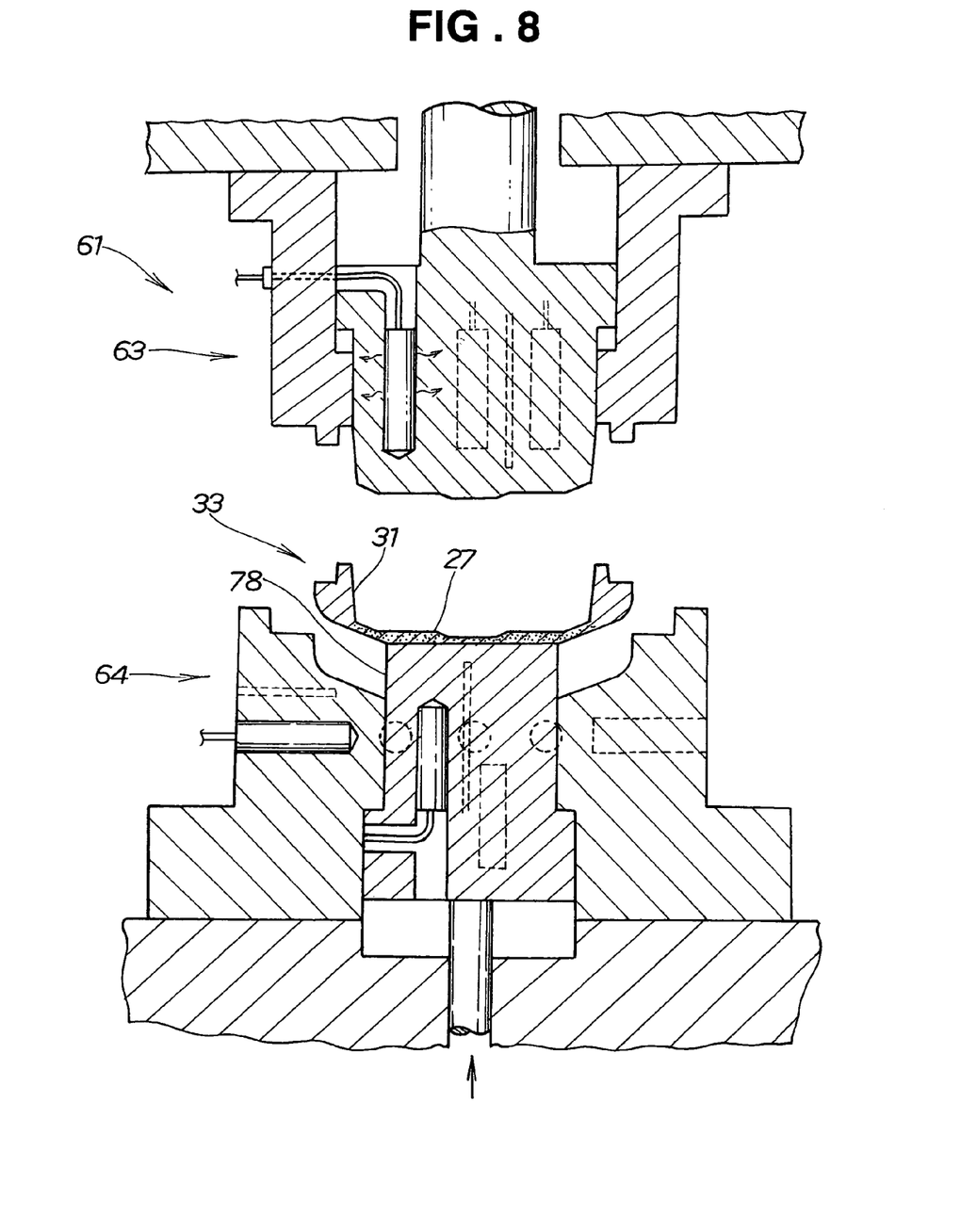

Finally, the split mold 61 is opened to eject a molded drum 33, as shown in FIG. 8. More specifically, the split upper punch 63 is raised and the ejector 78 in the lower die 64 is projected (e.g., by using pneumatic equipment) to release the molded drum 33 from the lower die 64. This step terminates one cycle of brake drum molding. Return to FIG. 5 to start another cycle.

Figure 9:
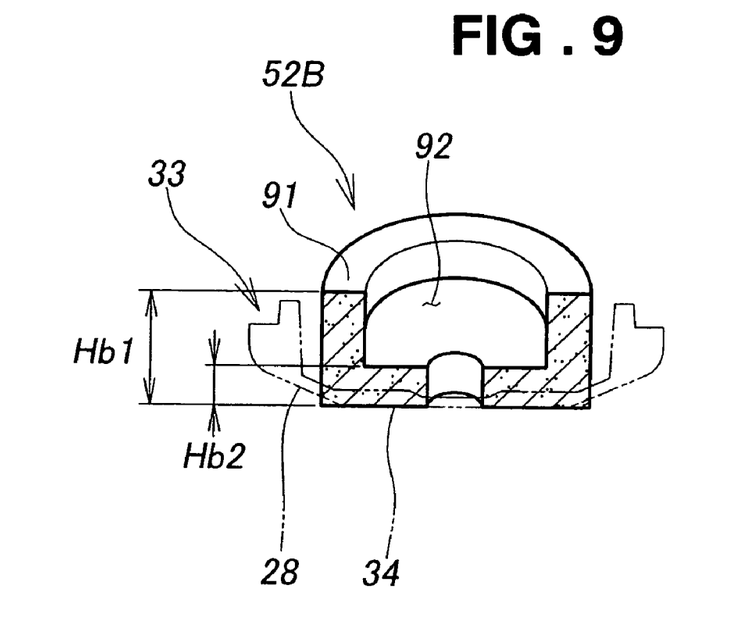
FIG. 9 is a view showing another type of preform embodying this invention.

Reference is now made to FIG. 9 explaining a different manufacturing process embodying this invention. This process is characterized by employing a different type of preform 52B. The preform 52B has a first block portion 91 adapted to form an outer edge 28 and a second block portion 92 adapted to form the remaining or connecting portion 34. The outer edge 28 corresponds to the corner portion and covers substantially the same area with the conical part 36 (FIG. 2A).

The first block portion 91 has a preform height Nb1 which is larger than the preform height Hb2 of the second block portion 92. The preform 52B having a larger thickness in its portion adapted to form the outer edge 28 than in its remaining portion as described makes it possible to give a higher compression ratio to the outer edge 28 than to any other portion and thereby manufacture a brake drum 16 having its strength increased in its outer edge 28 without altering the outer edge 28 in construction and without calling for any substantial amount of time or labor.

Referring to the process for manufacturing a brake drum, the central portion of a mold, such as the centering mold surface 71 of the split mold 61, is pressed against the central portion of the preform 52B and its radially outward portion, such as the flat mold surface 72 of the split mold 61, is successively pressed thereagainst, so that the material of the preform 52B can be caused to flow and extend from its center substantially uniformly in every radially outward direction, thereby restraining the occurrence of any cold shut from the confluence of the preform material or any phenomenon impairing the shape of a molded product, such as shrinkage. Therefore, it is advantageously possible to realize a good yield.

Although the brake drum and manufacturing process embodying this invention have been described as being applied to a vehicular brake drum, this invention is applicable to any cup-shaped component having a bottom connected to another part or structure, or any other ordinary machine part.

Obviously, various minor changes and modifications of the present invention are possible in the light of the above teaching. It is therefore to be understood that within the scope of the appended claims the invention may be practiced otherwise than as specifically described.

What is claimed is:

1. A process for manufacturing a cup-shaped brake drum having a disk portion to be secured to an axle and a cylindrical portion protruding from an outer edge of the disk portion in parallel to the axle and having an inner peripheral surface with which a brake shoe may be brought into contact to exhibit a braking action, the process comprising the steps of:

preparing a preform by dispersing ceramics in a metal matrix; and compression-molding the preform by applying a higher compression ratio to the disk portion than to the rest, so that the matrix is moved from the disk portion to the outer edge thereof and the cylindrical portion to cause the disk portion to have a first non-zero ceramic content by volume and the cylindrical portion to have a second non-zero ceramic content by volume that is less than the first non-zero ceramic content by volume.

2. A process according to claim 1, wherein the preform has a large thickness along an outer edge thereof and a small thickness in the rest thereof, so that the outer edge of the disk portion has a higher compression ratio than the rest of the brake drum.

3. A process according to claim 1, wherein a mold used for the compression molding step has in a capacity thereof clearances selected such that the disk portion has a higher compression ratio than the rest of the brake drum.

* * * * *